Aug. 26, 1958 D. W. GUSTAFSON 2,849,615

CIRCUIT ARRANGEMENT FOR CONVERTING A LOW VOLTAGE INTO A HIGH A. C. VOLTAGE

Filed June 17, 1957 2 Sheets-Sheet 1

INVENTOR.
DARREL W. GUSTAFSON
BY Max Schwartz
ATTORNEY

CIRCUIT ARRANGEMENT FOR CONVERTING A LOW VOLTAGE INTO A HIGH A. C. VOLTAGE

Filed June 17, 1957

INVENTOR.
DARREL W. GUSTAFSON
BY Max Schwartz
ATTORNEY

United States Patent Office 2,849,615

Patented Aug. 26, 1958

2,849,615

CIRCUIT ARRANGEMENT FOR CONVERTING A LOW VOLTAGE INTO A HIGH A. C. VOLTAGE

Darrel W. Gustafson, Attleboro, Mass., assignor to Contronics, Inc., Providence, R. I., a corporation of Rhode Island Application June 17, 1957, Serial No. 665,978

16 Claims. (Cl. 250—36)

My present invention relates to a circuit arrangement for converting a low D. C. voltage to a high A. C. voltage oscillating at or less than 1 kc.

The principal object of the present invention is to provide a transistor oscillator with a voltage transformer feedback network for converting low D. C. voltage to a high A. C. voltage.

A further object of the present invention is to provide a transistor oscillator circuit which is particularly adapted for use as a power supply unit for providing high A. C. voltage.

Another object of the present invention is to provide a transistor oscillator circuit which will maintain high A. C. output voltage when connected to loads which require high surge starting currents such as capacitors or electroluminescent lamps connected in series or parallel or combinations thereof whose input characteristics is a capacitive reactance.

A further object of the present invention is to provide a novel oscillator having the capability of maintaining oscillations when the load on the oscillator is changed from maximum capacitive reactance to minimum capacitive reactance.

With the above and other objects and advantageous features in view, my invention consists of a novel arrangement of parts, more fully disclosed in the detailed description following, in conjunction with the accompanying drawings, and more particularly defined in the appended claims.

Certain devices having the input characteristics of a capacitive reactance, require a high A. C. voltage oscillating at under 1 kc. For example, an electroluminescent lamp requires A. C. current at a minimum of about 150 v. oscillating at a minimum of 60 cycles, but preferably at about 300 cycles. Where such a lamp is to be used where no power is available other than a low voltage battery, a power supply unit must be provided to change the low D. C. voltage to a high A. C. voltage oscillating in the required range. The unit should be compact, efficient, and comparatively easy and economical to manufacture.

The present invention is designed to accomplish this purpose by providing an audio frequency oscillator that includes a simple transistor, transformer-coupled to the load, and having a separate voltage transformer feedback network between the output and input of the transistor.

Figure 1:
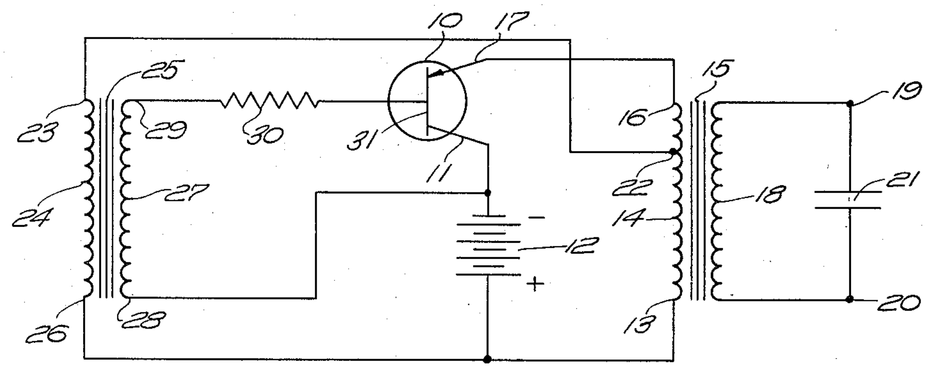
Fig. 1 is a circuit diagram of a common-collector transistor oscillator according to the present invention.

Fig. 1 illustrates the preferred embodiment of the invention. Referring to Fig. 1, the oscillator of the present invention comprises a P–N–P transistor 10 whose collector 11 is connected directly to the negative terminal of a D. C. low voltage source 12, which may be a 6, 12 or 28 volt battery. The positive terminal of the battery 12 is connected to one end 13 of the primary winding 14 of a transformer 15. The opposite end 16 of the primary winding 14 is connected to the emitter 17 of the transistor 10. The secondary winding 18 of the transformer 15 has its terminals 19 and 20 connected directly to the capacitive load 21. The secondary winding 18 has a sufficient number of turns to provide the desired voltage step up for operating the load 21.

Terminal 22 on the primary winding 14 of transformer 15 is connected to one end 23 of the primary winding 24 of the feedback transformer 25. The opposite end 26 of the primary winding 24 is connected back to the end 13 of the primary winding 14 of the transformer 15. The terminal 22 is so located that the impedance between the terminal 22 and the end 13 of the primary winding 14 is the same as that presented between the ends 23 and 26 of the primary winding 24 of the feedback transformer 25. The feedback primary winding 24 is not inductively coupled to the primary winding 14 of transformer 15. The secondary winding 27 of the feedback transformer 25 has one end 28 connected to the collector 11 of the transistor 10 and to the negative terminal of the battery 12. The other end 29 of the feedback secondary winding 27 is connected to one end of a series resistor 30. The other end of the resistor 30 is connected directly to the base electrode 31 of the transistor 10. The number of turns on the feedback secondary winding 27 exceeds the number of turns on the feedback primary 24 by an amount sufficient to provide the feedback driving voltage necessary to establish oscillation.

The transistor 10 is preferably of a type which is able to maintain high gain at emitter currents of the order of amperes. In the desirable embodiment the transistor is a P–N–P alloy junction transistor. Other types of transistors may also be used. If an N–P–N transistor is used, the bias connections for the emitter and collector electrodes will be reversed from the arrangement shown in Fig. 1.

The transistor 10 is comprised of a semi-conductor body contacted by the collector 11 emitter 17 and base 31 electrodes. The base electrode 31 makes low resistance ohmic contact with the semi-conductor body. The emitter 17 makes rectifier contact with the semi-conductor body and is biased by the battery 12 for current conduction in the forward or low resistance direction. The collector electrode 11 makes rectifier contact with the semi-conductor body and is biased for current conduction in the reverse or high resistance direction.

The following is an analysis of the operation of the circuit, without limiting the invention to this theory of operation.

With the capacitor 21 not connected to the circuit, as soon as the battery 12 is connected as shown in Fig. 1, the transistor 10 will spontaneously begin to conduct current between the collector 11 and emitter 17 and through the primary winding 14 of the transformer 15. This current flow will induce a voltage between the ends 13 and 16 of the primary winding 14. The same current flow will also cause a smaller voltage in the primary winding 14 between the end 13 and the terminal 22. This latter voltage is also applied between the ends 23 and 26 of the primary winding 24 of the feedback transformer 25 and in turn induces a current in the feedback secondary winding 27. This current causes a voltage drop between the collector 11 and base 31 which drives the base 31 more positive with respect to the collector 11 thereby causing the base to draw more current. It may be noted that at this point a mismatch in impedances will be present between the end 13 and terminal 22 of the primary winding 14 and the ends 23 and 26 of the primary winding 24.

As the base 31 draws more current the forward resistance between the base 31 and the collector 11 lessens. As the base current increases, the sum of the series resistance 30 and the decreasing forward resistance between the base 31 and collector 11 produces a load impedance across the feedback secondary winding 27 that is reflected back to the primary winding 24 as an impedance which more nearly matches the impedance between the end 13 and terminal 22 of primary winding 14. This effect is enhanced by a further increase in current at the emitter 17 so that the voltage at the emitter approaches the voltage at the collector 11 and the impedance appearing between the ends of the feedback primary winding 24 becomes nearly equal to the impedance between the end 13 and terminal 22 of primary winding 14. Therefore, the voltage drop across the ends 13 and 16 of primary winding 14 becomes nearly equal to the battery voltage.

While the current at the emitter 17 increases as described above, it cannot increase abruptly because of the inductance of primary winding 14 and feedback primary winding 24 through which it flows. Because of this inductance the current increases exponentially in accordance with the L/R time constant of the circuit, where L is the combination of inductances of the primary windings 14 and 24 and R is the sum of the effective resistances between the end 16 and terminal 22 of the primary winding 14 plus the parallel combination of end 13 and terminal 22 of primary winding 14 and feedback primary winding 24 plus the emitter impedance of the transistor 10. The emitter current thus increases relatively slowly and exponentially toward a final saturation value which is determined by the forward bias voltage between the base 31 and collector 11 of the transistor 10.

As the current saturation point is reached at emitter 17, the voltage across the primary winding 14 and across the feedback primary winding 24 drops nearly to zero because the rate of change of emitter current is now approximately zero. Since the voltage across the feedback primary winding 24 is nearly zero no current is induced in the feed back secondary winding 27 and the forward bias voltage between the base 31 and collector 11 is removed. This action restores the circuit to initial conditions wherein the full voltage of the battery 12 is again applied between the emitter 17 and collector 11 and the cycle repeats again as described above.

With the capacitor 21 connected between the ends 19 and 20 of the secondary winding 18 of transformer 15, the capacitor is charged only during that portion of the cycle, above described, that the emitter 17 of the transistor 10 is conducting current. While the emitter 17 is conducting current, this same current flows in the primary winding 14 and induces a voltage in the secondary winding 18 which charges capacitor 21 to a peak voltage determined by the ratio of turns between the primary winding 14 and secondary winding 18 of the transformer 15. When the current at the emitter 17 reaches the saturation point, the rate of change of current in the primary winding 14 is at a minimum and the voltage induced in the secondary winding 18 is thus also at a minimum. The capacitor 21 will then begin to discharge its stored charge back into the secondary winding 18 in the form of a current. This discharge current will induce a voltage of opposite polarity from that produced originally by the emitter 17 in the primary winding 14. This opposing current also produces a voltage between the end 13 and terminal 22 of primary winding 14 which in turn appears across feedback primary winding 24. This current is now induced in the feedback secondary winding 27 opposed to the current which originally started the base 31 to draw current as originally described. This action tends to hold the reverse bias between the base 31 and collector 11 on longer than when the capacitor 21 had not been connected to the circuit. The length of time the reverse bias is maintained is dependent upon the time constant L/R of the primary windings 14 and 24 and emitter impedance, and the reverse current time constant of secondary winding 18 and capacitor 21. The overall effect, therefore, of operating with the capacitor load 21 is to lower the oscillating frequency from an initial frequency without capacitive load and to maintain the A. C. voltage across the capacitive load at a high level.

Figure 2:
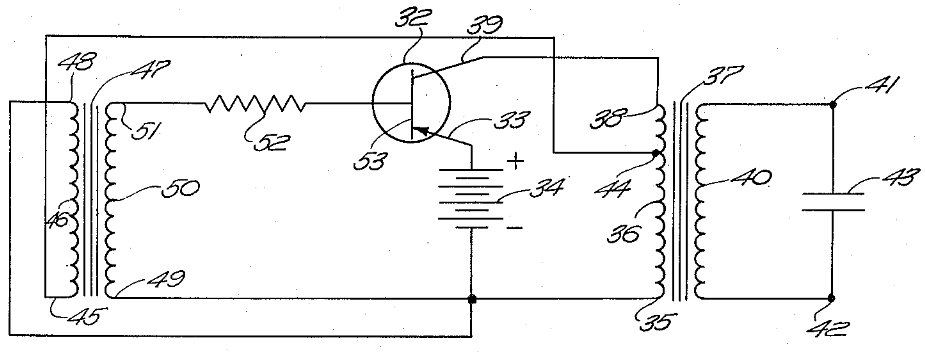
Fig. 2 is a circuit diagram of a common-emitter transistor oscillator in accordance with the present invention.

Fig. 2 illustrates a second embodiment of the invention utilizing a common emitter transistor oscillator. Here again it is preferred to use a P–N–P transistor 32 of the same type as shown in Fig. 1 and having its emitter 33 connected directly to the positive terminal of the battery 34 which provides the source of low voltage direct current. The negative terminal of the battery 34 is connected to one end 35 of the primary winding 36 of the transformer 37. The opposite terminal 38 of the winding 36 is connected to the collector 39 of the transistor 32. The secondary winding 40 of the transformer 37 has terminals 41 and 42 connected directly to a capacitor 43. The secondary winding 40 has a sufficient number of turns to provide the desired voltage step up for operating the load 43.

A terminal 44 on the primary winding 36 is connected to one end 45 of the primary winding 46 on the feedback transformer 47. The opposite end 48 of the feedback primary 46 is connected back to the negative terminal of the battery 34, the end 35 of the primary winding 36 of the transformer 37, and to the end 49 of the secondary winding 50 of the feedback transformer 47. The terminal 44 is located on the primary winding 36 so that the impedance between the terminal 44 and the end 35 is the same as that presented between the ends 45 and 48 of the feedback primary winding 46. The feedback primary winding 46 is not inductively coupled to the primary winding 36. The feedback secondary winding 50 has one end 49 connected as above described and the other end 51 is connected to one end of a series resistor 52. The opposite end of the resistor 52 is connected directly to the base 53 of the transistor 32. The number of turns on the feedback secondary winding 50 exceeds the number of turns on the feedback primary winding 46 by an amount sufficient to provide feedback driving voltage necessary to establish oscillation.

The theory of operation of the form shown in Fig. 2 is essentially the same as the preferred embodiment shown in Fig. 1. The description of the operation of Fig. 1 can accordingly be readily applied to Fig. 2.

Figure 3:
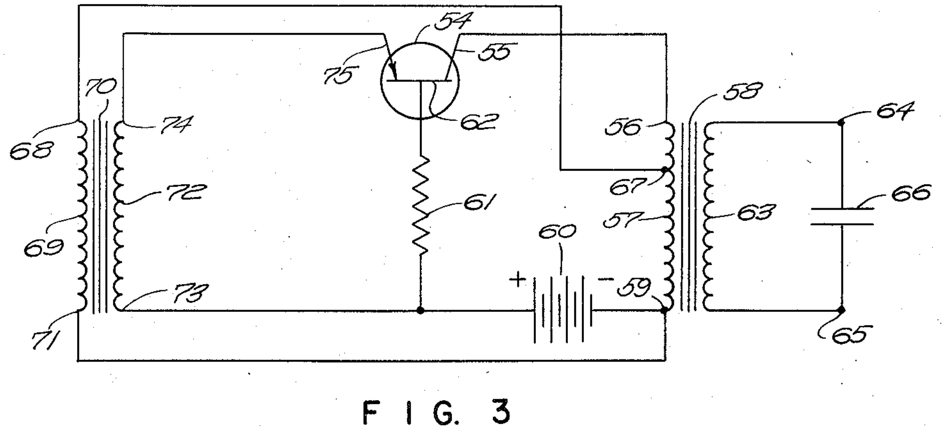
Fig. 3 is a circuit diagram of a common-base transistor oscillator in accordance with the present invention.

Fig. 3 illustrates a third embodiment of the invention embodying a common base transistor oscillator. In this form a P–N–P transistor 54 of the type shown in Fig. 1 has its collector 55 connected to one end 56 of the primary winding 57 of transformer 58. The other end 59 of the primary winding 57 is connected to the negative terminal of a direct current low voltage battery 60. The positive terminal of the battery 60 is connected to one end of a series resistor 61 which is in turn connected at the other end to the base 62 of the transistor 54. The secondary winding 63 of the transformer 58 are connected at each end at terminals 64 and 65 to a capacitor 66. The secondary winding 63 has a sufficient number of turns to provide the desired voltage step up for operating the load 66.

A terminal 67 on the primary winding 57 is connected to one end 68 of a primary winding 69 of the feedback transformer 70. The opposite end 71 of the feedback primary winding 69 is connected back to the end 59 of the primary winding 57. The terminal 67 is so located on primary winding 57 that the impedance between the end 59 and the terminal 67 is the same as that presented between the ends 68 and 71 of the feedback primary winding 69. The feedback primary winding 69 is not inductively coupled to the primary winding 57. The feedback secondary winding 72 has one end 73 conected to the series resistor 61 and the positive terminal of the battery 60. The opposite end 74 of the feedback secondary winding 72 is connected to the emitter 75 of the transistor 54. The number of turns on the feedback secondary winding 72 is less than the number of turns on the feedback primary winding 69 by an amount sufficient to provide feedback driving current necessary to establish oscillations.

The theory of operation of the form shown in Fig. 3 is essentially the same as that described for Fig. 1 and no description is deemed necessary.

Figure 4:
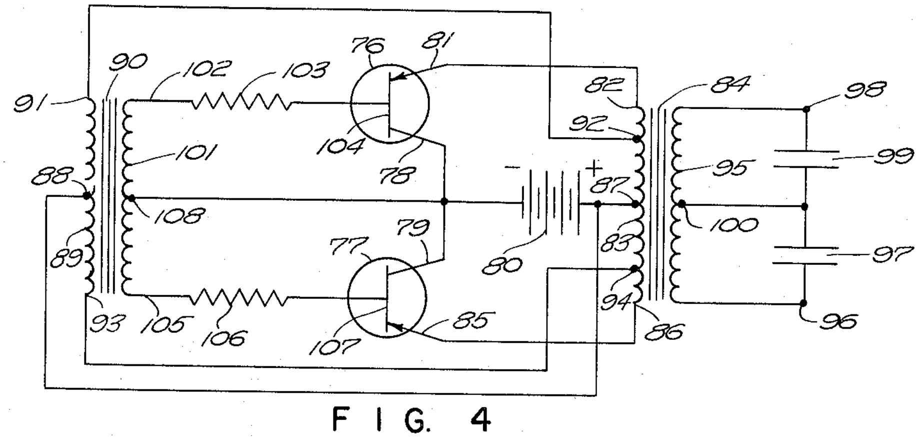
Figs. 4, 5 and 6 are circuit diagrams of common-collector, common-emitter and common-base transistor oscillators, respectively, using two transistors to each circuit.
Figure 5:
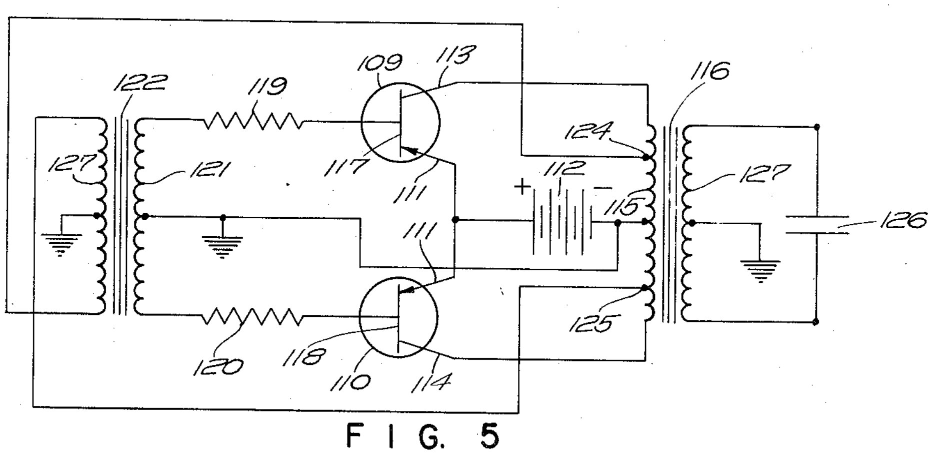
Figure 6:
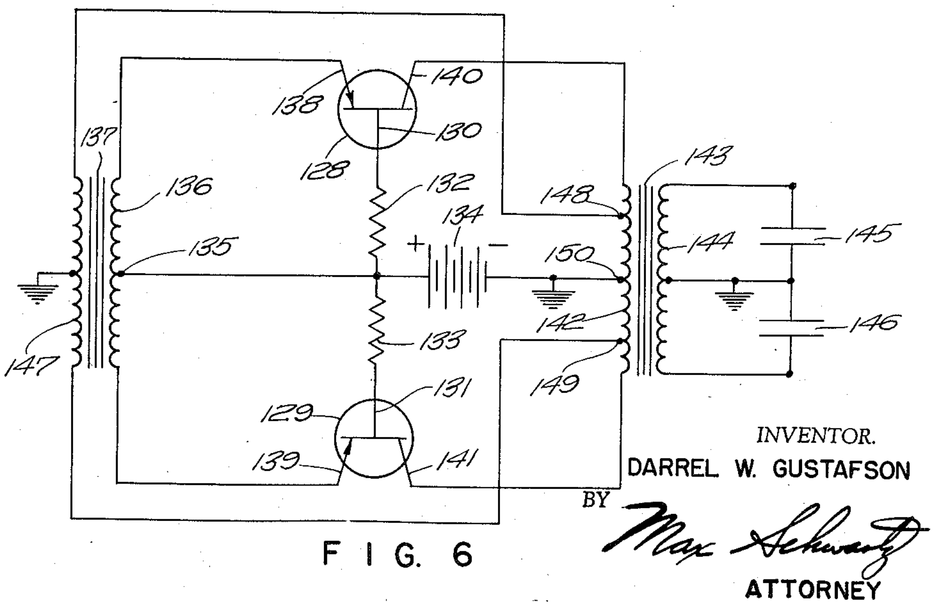

Figs. 4, 5 and 6 correspond to Figs. 1, 2 and 3, illustrating the principles of the invention applied to a two transistor circuit. Similarly the number of transistors can be multiplied to higher multiples. Fig. 4 for example, corresponds to the circuit illustrated in Fig. 1. The transistors 76 and 77 are hooked up so that the collectors 78 and 79 are joined and connected to the negative pole of the low voltage direct current battery 80. The emitter 81 of the transistor 76 is connected to one end 82 of the primary winding 83 of the transformer 84. The emitter 85 of the transistor 77 is connected to the other end 86 of the primary winding 83. A terminal 87 on the primary winding 83, at the midway point is connected to the positive pole of the battery 80 and to a terminal 88 in the middle of the primary winding 89 of the feedback transformer 90. One end 91 of the feedback primary winding 89 is connected to a terminal 92 on the primary winding 83. The other end 93 of the feedback primary winding 89 is connected to a terminal 94 on the primary winding 83. The secondary winding 95 of the transformer 84 is connected at one end 96 to one side of a capacitor 97, and the other end 98 of the secondary winding 95 is connected to one side of a capacitor 99. The other sides of the capacitors 97 and 99 are connected to each other and to a terminal 100 on the secondary winding 95. The secondary feedback winding 101 is connected at one end 102 to one side of a series resistor 103. The other side of the series resistor 103 is connected to the base 104 of the transistor 76. The other end 105 of the secondary feedback winding 101 is connected to a series resistor 106. The other side of the series resistor 106 is connected to the base 107 of the transistor 77. A terminal 108 on the feedback secondary winding 101 is connected to the collectors 78 and 79 and to the negative terminal of the battery 80.

It will be noted, comparing Figs. 1 and 4 that the circuits are identical except that the circuit in Fig. 4 operates with two transistors and two capacitors forming a double circuit. The theory of operation is identical.

Similarly, Fig. 5 duplicates the circuit shown in Fig. 2 and doubles the circuit to take care of two transistors. Here the transistors 109 and 110 have their emitters 111 connected to each other and to the positive terminal of the battery 112. The collectors 113 and 114 are connected to each end of the primary winding 115 of the transformer 116. The bases 117 and 118 of the respective transistors are each connected to a series resistor 119 and 120 and to each end of the secondary feedback winding 121 of the feedback transformer 122. The feedback primary winding 123 is tied into terminals 124 and 125 on the primary winding 115. The capacitor 126 is connected to each end of the secondary winding 127 of the transformer 116.

The form shown in Fig. 6 is similarly a duplicate of the form shown in Fig. 3 with the circuit doubled to take care of the two transistors. The transistors 128 and 129 each have their bases 130 and 131 extending through a series resistor 132 and 133 which are connected to the positive terminal of the battery 134 and to a terminal 135 on the secondary feedback winding 136 of the feedback transformer 137. The respective emitters 138 and 139 are connected to each end of the secondary feedback winding 136. The collectors 140 and 141 are connected to each end of the primary winding 142 of the transformer 143. The secondary winding 144 is connected from each end to capacitors 145 and 146 in series. The primary winding 147 of the feedback transformer 137 is tied to terminals 148 and 149 of the primary winding 142 and a terminal 150 on the primary winding 142 is connected to the negative terminal of the battery 134.

The various ground connections in the circuits shown in Figs. 5 and 6 complete the tie in of these circuits to conform to the corresponding circuits shown in Figs. 2 and 3.

The power supply unit described herein is thus particularly adaptable for transforming a low voltage direct current to a high voltage alternating current oscillating at a comparatively high rate but below 1 kc. For example if an electroluminescent lamp is used in some portion of an automobile, the power supply unit of the present invention will transform the automobile battery current to a high voltage A. C. current to operate the lamp. Similarly other capacitor constructions requiring high voltage A. C. currents can be battery operated by the use of the present invention. Other advantages of the present invention will be readily apparent to a person skilled in the art.

I claim:

1. A transistor oscillator for converting a low direct-current voltage into a high alternating-current voltage, comprising a transistor, power supply connections for the transistor, input and output circuits for the transistor, a feedback transformer having a primary winding connected in parallel to a portion of the output circuit so that there is an impedance match between said feedback primary winding and said portion of the output circuit, and a secondary winding on said feedback transformer inductively coupled to said feedback primary winding and connected in said input circuit to supply regenerative feedback energy to said transistor.

2. A transistor oscillator for converting a low direct-current voltage into a high alternating-current voltage, comprising a transistor, power supply connections for the transistor, input and output circuits for the transistor, a transformer in said output circuit, a feedback transformer having a primary winding connected in parallel to a portion of the primary winding of said output transformer so that there is an impedance match between said feedback primary winding and said portion of the output primary winding, and a secondary winding on said feedback transformer inductively coupled to said feedback primary winding and connected in said input circuit to supply regenerative feedback energy to said transistor.

3. A transistor oscillator for converting a low direct current voltage into a high alternating-current voltage, comprising a transistor, power supply connections for the transistor, input and output circuits for the transistor, a capacitive load connected to said output circuit, a feedback transformer having a primary winding connected in parallel to a portion of the output circuit so that there is an impedance match between said feedback primary winding and said portion of the output circuit, and a secondary winding on said feedback transformer inductively coupled to said feedback primary winding and connected in said input circuit to supply regenerative feedback energy to said transistor.

4. A transistor oscillator for converting a low direct-current voltage into a high alternating-current voltage, comprising a transistor, power supply connections for the transistor, input and output circuits for the transistor, a transformer in said output circuit, a capacitive load connected to the secondary winding of said output transformer, a feedback transformer having a primary winding connected in parallel to a portion of the primary winding of said output transformer so that there is an impedance match between said feedback primary winding and said portion of the output primary winding, and a secondary winding on said feedback transformer inductively coupled to said feedback primary winding and connected in said input circuit to supply regenerative feedback energy to said transistor.

5. A transistor oscillator for converting a low direct-current voltage into a high alternating-current voltage, comprising a transistor, power supply connections for the transistor, input and output circuits for the transistor, a feedback transformer having a primary winding connected in parallel to a portion of the output circuit so that there is an impedance match between said feedback primary winding and said portion of the output circuit, and a secondary winding on said feedback transformer inductively coupled to said feedback primary winding and connected through a series resistor in said input circuit to supply regenerative feedback energy to said transistor.

6. A transistor oscillator for converting a low direct current voltage into a high alternating-current voltage, comprising a transistor, power supply connections for the transistor, input and output circuits for the transistor, a transformer in said output circuit, a feedback transformer having a primary winding connected in parallel to a portion of the primary winding of said output transformer so that there is an impedance match between said feedback primary winding and said portion of the output primary winding, and a secondary winding on said feedback transformer inductively coupled to said feedback primary winding and connected through a series resistor in said input circuit to supply regenerative feedback energy to said transistor.

7. A transistor oscillator for converting a low direct-current voltage into a high alternating current voltage, comprising a transistor, power supply connections for the transistor, input and output circuits for the transistor, a capacitive load connected to said output circuit, a feedback transformer having a primary winding connected in parallel to a portion of the output circuit so that there is an impedance match between said feedback primary winding and said portion of the output circuit, and a secondary winding on said feedback transformer inductively coupled to said feedback primary winding and connected through a series resistor in said input circuit to supply regenerative feedback energy to said transistor.

8. A transistor oscillator for converting a low direct-current voltage into a high alternating-current voltage, comprising a transistor, power supply connections for the transistor, input and output circuits for the transistor, a transformer in said output circuit, a capacitive load connected to the secondary winding of said output transformer, a feedback transformer having a primary winding connected in parallel to a portion of the primary winding of said output transformer so that there is an impedance match between said feedback primary winding and said portion of the output primary winding, and a secondary winding on said feedback transformer inductively coupled to said feedback primary winding and connected through a series resistor in said input circuit to supply regenerative feedback energy to said transistor.

9. A transistor oscillator for converting a low direct-current voltage into a high alternating-current voltage, comprising a transistor, said transistor having a base, emitter and collector electrodes, a power supply source of low direct-current voltage having its negative terminal connected to said collector, an output transformer having a primary winding with one end connected to said emitter and its other end connected to the positive terminal of said power supply, a feedback transformer having a primary winding with one end connected to the positive terminal of said power supply and to one end of said output primary winding and the other end of said feedback primary winding connected to a tap on said output primary winding so that there is an impedance match between said feedback primary winding and the portion of said output primary winding between said tap and the end connected to said power supply, and a secondary winding on said feedback transformer inductively coupled to said feedback primary winding and having one end connected to said collector and power supply negative terminal and the other end connected through a series resistor to said base.

10. A transistor oscillator for converting a low direct-current voltage into a high alternating-current voltage, comprising a transistor, said transistor having a base, emitter and collector electrodes, a power supply source of low direct-current voltage having its negative terminal connected to said collector, an output transformer having a primary winding with one end connected to said emitter and its other end connected to the positive terminal of said power supply, a secondary winding on said output transformer inductively coupled to said primary winding with its ends connected to a capacitive load, a feedback transformer having a primary winding with one end connected to the positive terminal of said power supply and to one end of said output primary winding and the other end of said feedback primary winding connected to a tap on said output primary winding so that there is an impedance match between said feedback primary winding and the portion of said output primary winding between said tap and the end connected to said power supply, and a secondary winding on said feedback transformer inductively coupled to said feedback primary winding and having one end connected to said collector and power supply negative terminal and the other end connected through a series resistor to said base.

11. A transistor oscillator for converting a low direct-current voltage into a high alternating-current voltage, comprising a pair of transistors connected in push-pull relation and each having an input and an output, power supply connections for said transistors, a feedback transformer having a primary winding connected in parallel to a portion of each output circuit so that there is an impedance match between said feedback primary winding and said output circuit portions, and a secondary winding on said feedback transformer inductively coupled to said feedback primary winding and connected to the transistor inputs to supply regenerative feedback energy to said transistors.

12. A transistor oscillator for converting a low direct-current voltage into a high alternating-current voltage, comprising a pair of P–N–P transistors connected in push-pull relation and each having an input and an output, power supply connections for said transistors, an output transformer having a primary winding connected to said transistor outputs, a feedback transformer having a primary winding connected in parallel to a portion of the primary winding of said output transformer so that there is an impedance match between said feedback primary winding and said portion of said output primary winding, and a secondary winding on said feedback transformer inductively coupled to said feedback primary winding and connected in said input circuits to supply regenerative feedback energy to said transistors.

13. A transistor oscillator for converting a low direct-current voltage into a high alternating-current voltage, comprising a pair of transistors connected in push-pull relation and each having an input and an output, power supply connections for said transistors, a capacitive load connected to said output circuits, a feedback transformer having a primary winding connected in parallel to a portion of each output circuit so that there is an impedance match between said feedback primary winding and said output circuit portions, and a secondary winding on said feedback transformer inductively coupled to said feedback primary winding and connected to the transistor inputs to supply regenerative feedback energy to said transistors.

14. A transistor oscillator for converting a low direct-current voltage into a high alternating-current voltage, comprising a pair of P–N–P transistors connected in push-pull relation and each having an input and an output, power supply connections for said transistors, an output transformer having a primary winding connected to said transistor outputs, a capacitive load connected to the secondary winding of said output transformer, a feedback transformer having a primary winding connected in parallel to a portion of the primary winding of said output transformer so that there is an impedance match between said feedback primary winding and said portion of said output primary winding, and a secondary winding on said feedback transformer inductively coupled to said feedback primary winding and connected in said input circuits to supply regenerative feedback energy to said transistors.

15. A transistor oscillator for converting a low direct-current voltage into a high alternating-current voltage, comprising a pair of transistors connected in push-pull relation and each having an input and an output, power supply connections for said transistors, a feedback transformer having a primary winding connected in parallel to a portion of each output circuit so that there is an impedance match between said feedback primary winding and said output circuit portions, and a secondary winding on said feedback transformer inductively coupled to said feedback primary winding and connected to the transistor inputs through a pair of series resistors to supply regenerative feedback energy to said transistors.

16. A transistor oscillator for converting a low direct-current voltage into a high alternating-current voltage, comprising a pair of P–N–P transistors connected in push-pull relation and each having an input and an output, power supply connections for said transistors, an output transformer having a primary winding connected to said transistor outputs, a feedback transformer having a primary winding connected in parallel to a portion of the primary winding of said output transformer so that there is an impedance match between said feedback primary winding and said portion of said output primary winding, and a secondary winding on said feedback transformer inductively coupled to said feedback primary winding and connected in said input circuits through a pair of series resistors to supply regenerative feedback energy to said transistors.

References Cited in the file of this patent

UNITED STATES PATENTS

| | | |
|---|---|---|
| 2,748,274 | Pearlman | May 29, 1956 |
| 2,774,878 | Jensen | Dec. 18, 1956 |
| 2,783,380 | Bonn | Feb. 26, 1957 |
| 2,783,384 | Bright et al. | Feb. 26, 1957 |